US012679260B2

(12) United States Patent
Mauffrey et al.

(10) Patent No.: US 12,679,260 B2
(45) Date of Patent: Jul. 14, 2026

(54) SEAT SUPPORT ELEMENT COMPRISING A VENTILATION DEVICE FOR A BEARING SURFACE

(71) Applicant: Faurecia Sièges d'Automobile, Nanterre (FR)

(72) Inventors: Jean-Marie Mauffrey, Champagney (FR); Didier Duriez, Le Plessis-Pâté (FR); Solenne Dumont, Puteaux (FR)

(73) Assignee: Faurecia Sièges d'Automobile, Nanterre (FR)

( * ) Notice: Subject to any disclaimer, the term of this patent is extended or adjusted under 35 U.S.C. 154(b) by 180 days.

(21) Appl. No.: 18/360,907

(22) Filed: Jul. 28, 2023

(65) Prior Publication Data

US 2024/0034209 A1     Feb. 1, 2024

(51) Int. Cl.
    *B60N 2/56*         (2006.01)
(52) U.S. Cl.
    CPC ................................. *B60N 2/5657* (2013.01)
(58) Field of Classification Search
    CPC ...................................... B60N 2/5657
    USPC ...................................... 297/180.14
    See application file for complete search history.

(56)                References Cited

FOREIGN PATENT DOCUMENTS

| DE | 102018208505 A1 | 12/2018 |
| DE | 102017223557 A1 | 6/2019 |

OTHER PUBLICATIONS

French Search Report corresponding to application FR2207777, dated Mar. 8, 2023, 2 pages.
English language machine translation of DE102018208505A1, published Dec. 20, 2018.

*Primary Examiner* — Anthony D Barfield
(74) *Attorney, Agent, or Firm* — Reising Ethington P.C.

(57)                ABSTRACT

A seat support element having a frame and a padding mounted on the frame, extending between an internal surface, near the frame on an external side of the frame, and an external surface, opposite the internal surface and defining a bearing surface for an occupant of the seat. The support element includes a ventilation device for the bearing surface which includes a fan mounted on the frame and arranged to emit a gas flow toward the padding, and a bellows extending between the fan and the internal surface of the padding to transmit the gas flow of the fan to the padding. The bellows has a fastening tab passing through an orifice passing through the frame on the external side to an internal side of the frame, the fastening tab being attached to the frame on the internal side of the frame.

10 Claims, 4 Drawing Sheets

SEAT SUPPORT ELEMENT COMPRISING A VENTILATION DEVICE FOR A BEARING SURFACE

TECHNICAL FIELD

The present invention relates to a seat support element of the type comprising a frame and a padding mounted on the frame, said padding extending between an internal surface, near the frame on an external side of said frame, and an external surface, opposite the internal surface and defining a support surface for an occupant of the seat, the support element comprising a device for ventilating the bearing surface, said ventilation device comprising a fan, mounted on the frame and arranged to emit a gas flow toward the padding, and a bellows extending between the fan and the internal surface of the padding to transmit said gas flow from the fan to the padding.

BACKGROUND

Such a support element forms, for example, the backrest and/or the seat portion of a seat of a vehicle, for example a motor vehicle.

To improve the comfort of the occupant of such a seat, it is known to propose a device for ventilating the bearing surface of the support element, in order to ventilate the part of the body of the occupant applied against this bearing surface, for example the occupant's back in the case of a support element forming a seat back.

In order to ensure the sealing between the outlet of the fan of the ventilation device and the padding forming the bearing surface and into which the gas flow emitted by the fan must be injected, the ventilation device comprises for example a bellows ensuring the fluid communication between the outlet of the fan and the padding.

However, the mounting of such a bellows is generally complicated, in particular in order to limit the losses between the bellows and the fan, and if it is desired to be able to mount and remove the fan independently of the rest of the ventilation device.

SUMMARY

One of the aims of the invention is to overcome this disadvantage by proposing a seat support element comprising a ventilation device whose installation and removal are facilitated and which operates satisfactorily.

To this end, the invention relates to a support element of the aforementioned type, wherein the bellows comprises at least one fastening tab passing through an orifice passing through the frame on the external side to an internal side of the frame, opposite the external side, said fastening tab being attached to the frame on the internal side of said frame.

By fastening the bellows to the frame, it is possible to install and remove the fan independently of the rest of the ventilation device, for example for maintenance operations. Furthermore, the installation of the bellows on the frame is carried out particularly simply by means of a mechanical fastening of the fastening tab on the frame, this installation being more reversible. By passing the fastening tab from the external side to the internal side of the frame, the bellows is pressed against the frame, which makes it possible to limit the gas flow losses between the fan and the bellows.

The support element may comprise one or more of the following features, taken alone or in any technically feasible combination:

- the bellows comprises an internal end in fluid communication with the fan and an external end attached to the padding and in fluid communication with said padding, the bellows defining a duct extending along an axis from the internal end to the external end, the fastening tab extending projecting from the internal end substantially in a direction radial to the axis outside the duct.
- the external end of the bellows is attached in a sealed manner to a lining of the padding, said lining forming the internal surface of the padding, said lining comprising a through opening, the external end of the bellows being in sealed fluid communication with said through opening so that the gas flow from the fan is transmitted to the interior of the padding through the lining by the duct of the bellows.
- the fan is mounted on the frame in an attachment opening of the frame from the internal side of said frame, the gas flow being emitted by the fan from the external side of said frame.
- the orifice receiving the fastening tab of the bellows extends along a part of the edge of the passage opening.
- the bellows comprises a plurality of fastening tabs, each fastening tab passing into a corresponding through-hole of the frame and being attached to the frame on the internal side of said frame.
- the through-holes are distributed around the passage opening.
- the fastening tab extends between a proximal end connected to the rest of the bellows and a distal end attached to the frame, the proximal end extending from the external side of the frame and the distal end extending from the internal side of the frame.
- the distal end comprises a fastening orifice, said fastening orifice cooperating with a hook extending projecting from the internal side of the frame to attach the fastening tab to the frame.
- the padding is movable relative to the frame between a rest position, wherein the internal surface of the padding extends against the frame, and an active position, wherein the internal surface of the padding is separated from the frame, the bellows being elastically deformable between a collapsed position, when the padding is in the rest position, and a deployed position, when the padding is in the active position.

BRIEF DESCRIPTION OF THE DRAWINGS

Other aspects and advantages of the invention will appear on reading the following description, given by way of example and made with reference to the appended drawings, wherein.

DETAILED DESCRIPTION

Figure 1:
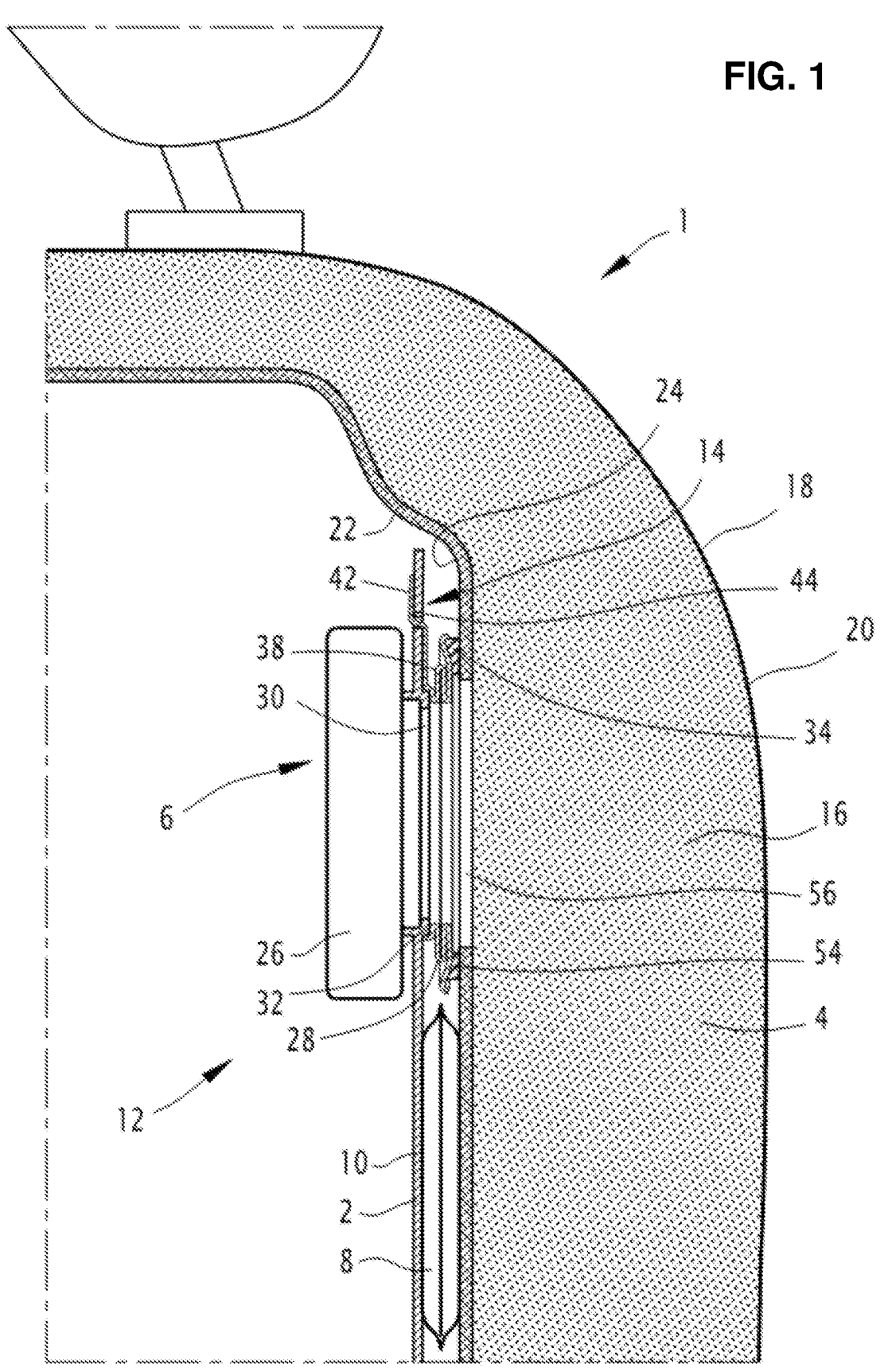
FIG. 1 is a schematic sectional view showing a support element according to an embodiment of the invention with the bellows in a retracted position.
Figure 3:
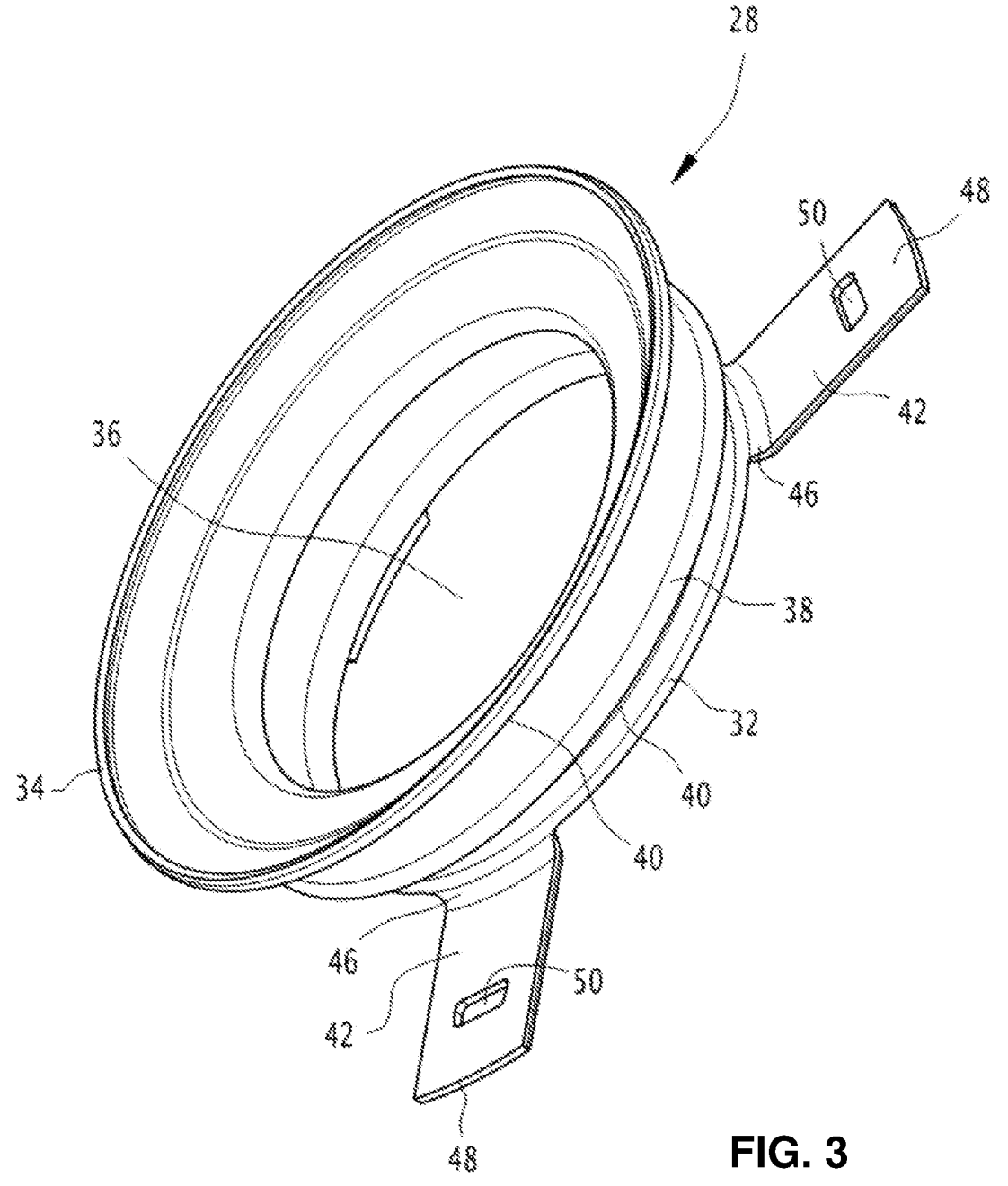
FIG. 3 is a schematic view in perspective of the bellows of FIGS. 1 and 2.

With reference to FIGS. 1 and 3, a seat support element 1 comprising a frame 2 and a padding 4 is described.

According to the embodiment of FIGS. 1 and 2, the support element is a seat back 1 and the rest of the description will be made with reference to such a seat back. It is understood, however, that the invention can also apply to a support element forming a seat portion.

In the description, the terms "internal" and "interior" refer to what is turned toward the interior of the seat, that is to say toward the frame 2, and the terms "external" and "exterior" refer to what is turned toward the exterior of the seat, that is to say toward the occupant of the seat when the latter is seated on the seat.

The frame 2 forms the "skeleton" of the support element 1 and is made so as to impart its rigidity to the support element 1 and to allow the support of functional elements of the support element 1, such as a ventilation device 6, one or more inflatable elements 8, as will be described in more detail later, a headrest and the like.

Conventionally, the frame 2 is for example in the form of framework (not shown), for example made of metal or plastics material. The frame 2 further comprises a support plate 10 mounted in the framework or integral therewith and for example forming part of the suspension or a support layer of the support element 1. As a variant, the support plate 10 simply serves as a support for the ventilation device 6 and, optionally, to one or more inflatable elements 8, as will be described later.

The frame 2 defines an internal side 12, on one side of the support plate 10, and an external side 14, on the other side of the support plate 10. In the case of a seat back, the internal side 12 is turned to the side of the back of the backrest, and the external side 14 is turned toward the bearing surface of the support element 1, against which the back of an occupant of the seat is applied when the occupant is seated on the seat.

The padding 4 is mounted on the frame 2 so as to cover the latter at least on the external side 14 of the frame 2. When the occupant of the seat rests on the support element, he rests against the padding 4, which is therefore arranged to impart comfort to the support element 2. To this end, the padding 4 comprises at least one layer of foam 16, for example covered externally by a decorative layer 18, forming the external surface 20 of the padding 4. The external surface 20 forms the bearing surface of the support element 1. In a known manner, the decorative layer 18 is for example formed by a skin, made of natural or synthetic material, a textile or the like. On the inside, opposite the frame 2, the padding 4 comprises for example a lining 22 applied against an internal surface of the foam layer 16 and attached thereto. Thus, the lining 22 is interposed between the frame 2, more particularly the support plate 10, and the foam layer 16. The lining 22 is for example formed by a nonwoven fabric, for example impermeable, attached to the foam layer by stitching, bonding, overmolding or the like.

Thus, the padding 4 extends between an internal surface 24, for example formed by the internal surface of the lining 22, and the external surface 20, for example formed by the external surface of the decorative layer 16, forming the bearing surface of the support element 1. The internal surface 22 extends near the frame 2 on the external side 14 thereof.

It is understood that the padding 4 can cover other parts of the frame 2, for example on the sides, above and/or below the frame. The padding 4 can also extend opposite at least part of the frame 2 on the internal side 12 thereof.

As indicated above, the support element 1 further comprises a ventilation device 6 arranged to ventilate the bearing surface of the support element 1 in order to improve the comfort of the occupant of the seat.

The ventilation device 6 more particularly comprises a fan 26 and a bellows 28 mounted on the frame 2, and more particularly on the support plate 10.

Figure 4:
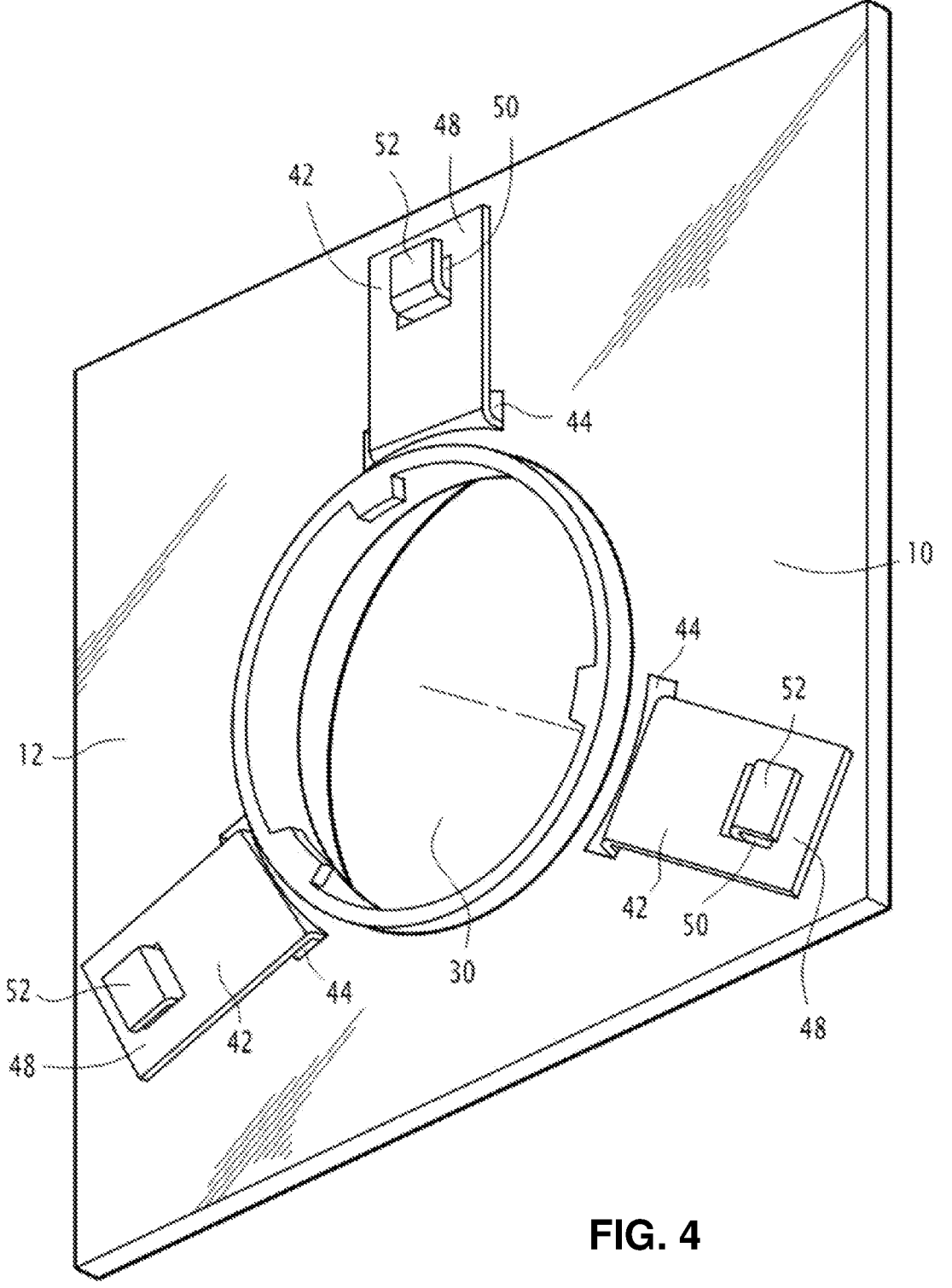
FIG. 4 is a schematic view in perspective of the attachment between the bellows and the frame of a support element according to an embodiment of the invention.

More particularly, the fan 26 is for example mounted in an attachment opening 30 of the frame 2, more particularly visible in FIG. 4. The attachment opening 30 passes through the support plate 10. Thus, the attachment opening 30 is open on the internal side 12 and on the external side 14 of the frame 2. The fan 26 is for example fitted into the attachment opening or attached around it, preferably from the internal side 12 of the frame 2, which facilitates its mounting on and removal from the frame 2 because the internal side 12 of the frame 2 is more accessible than the external side 14 covered by the padding 4.

The fan 26 is arranged to emit a gas flow from the external side 14 of the frame 2 so that this gas flow is transmitted, in particular by the bellows 28, to the padding 4 and to the support surface 16. In other words, the outlet of the fan opens out from the outside of the frame 2.

Figure 2:
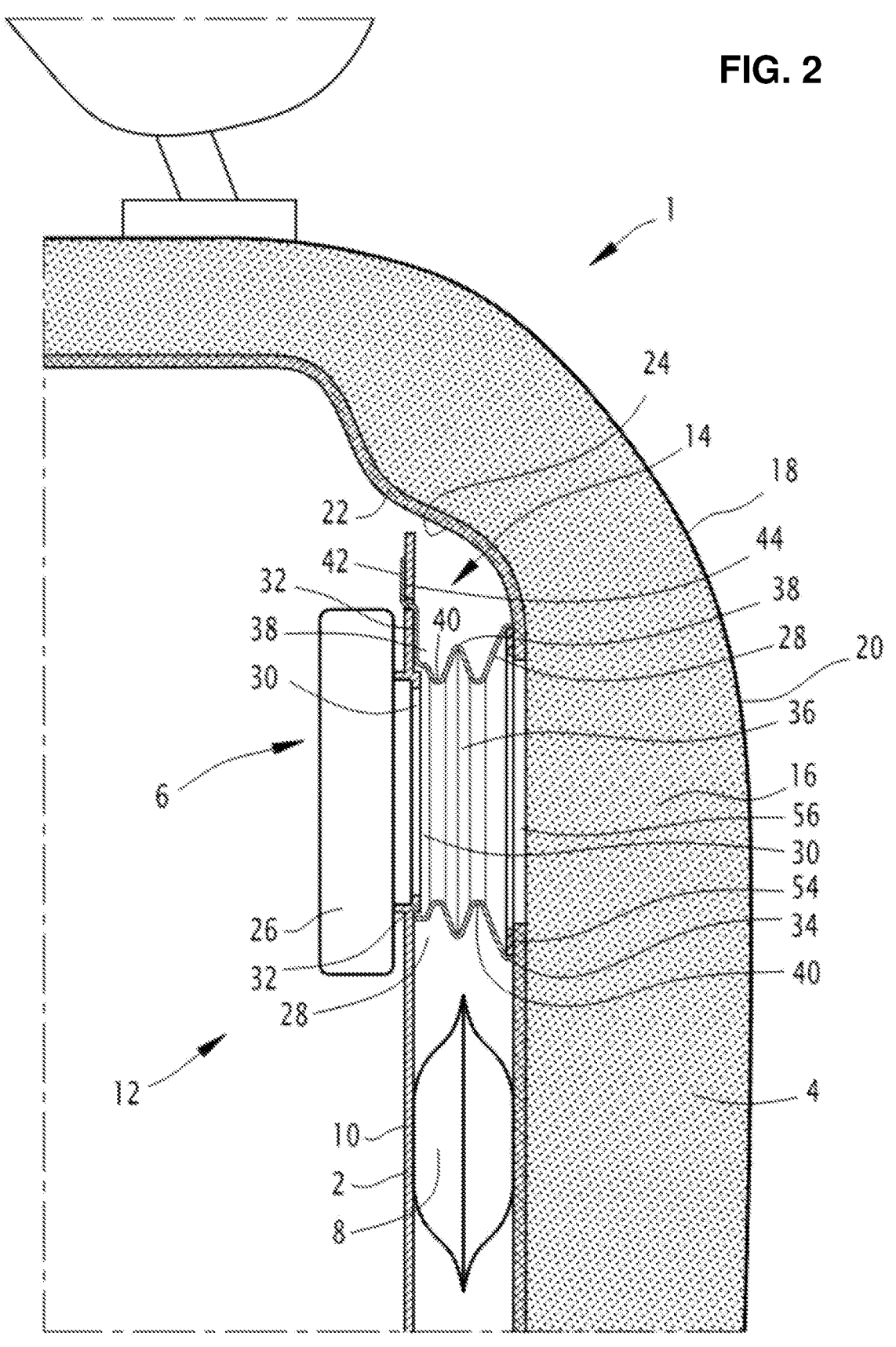
FIG. 2 is a schematic sectional view in perspective showing the support element of FIG. 1, with the bellows in a deployed position.

The bellows 28 extends mainly from the external side 14 of the frame 2 in order to place the outlet of the fan 26 in fluid communication with the padding 4, as can be seen more particularly in FIG. 2. The bellows 28 extends between an internal end 32 in fluid communication with the fan 26 and an external end 34 in fluid communication with the padding 4. Between the internal end 32 and the external end 34, the bellows 28 defines a duct 36 extending along an axis, in which duct the gas flow emitted by the fan circulates from the outlet of the fan 26 to the padding 4. The duct 36 has for example a cross-section of substantially circular shape. The diameter of the external end 34 is for example greater than the diameter of the internal end 32 so that the duct 36 has a generally flared shape. Furthermore, the bellows 28 comprises for example at least one area of enlarged diameter 38 between the internal 32 and external 34 ends, wherein the diameter of the duct is between that of the internal end 32 and the external end 34. The enlarged diameter area 38 extends between two areas of intermediate diameter 40, wherein the diameter of the conduit is respectively between the diameter of the internal end 32 and the diameter of the enlarged diameter area 38 and between the diameter of the enlarged diameter area 38 and the diameter of the external end 34. The bellows 28 is further made of a flexible material, such as an elastomeric material.

The shape and the material of the bellows 28 thus make it elastically deformable between a deployed position (FIGS. 2 and 3) and a collapsed position (FIG. 1). In the collapsed position, the bellows 28 is deformed along its axis so as to bring the external end 34 closer to the internal end 32 under the effect of a stress exerted on the bellows 28 in a direction parallel to the axis. In the natural state, that is without stress exerted on the bellows 28, the bellows 28 is in its deployed position, as shown in FIG. 3. Such a bellows 28 thus makes it possible to maintain the fluid communication between the fan 26 and the padding 4 in different positions of the padding 4 relative to the frame 2, as will be described in more detail later.

The bellows 28 further comprises at least one tab 42 for fastening to the frame 2, making it possible to attach the bellows 28 to the frame 2 on the internal side 12 thereof. For this purpose, the fastening tab 42 passes from the external side 14 to the internal side 12 through an orifice 44 passing through the frame 2 and is attached, preferably reversibly, to the frame 2 on the internal side 12 thereof. The orifice 44 for example passes through the support plate 10 in the vicinity of the attachment opening 30 of the fan 26, as can be seen more particularly in FIG. 4. More particularly, the orifice 44 extends along a part of the edge of the attachment opening 30.

Thus, the fastening tab 42, which is for example integral with the rest of the bellows 28, comprises a proximal end 46 integral with the rest of the bellows 28 extending from the external side 14 of the frame 2, and a distal end 48 opposite the proximal end 46, extending from the internal side 12 of the frame 2 and attached thereto, the fastening tab 42 extending into the orifice 44 between its proximal end 46 and its distal end 48.

The fastening tab 42 protrudes outside the duct 36, for example protruding from the internal end 32 of the bellows 28, in a radial direction relative to the axis of the duct 36, as shown in FIG. 3. The fastening tab 42, made of the same material as the rest of the bellows 28, is deformable so as to allow it to be inserted into the orifice 44. To ensure the fastening of the fastening tab 42 to the frame 2, the fastening tab 42 comprises for example a fastening orifice 50 near its distal end 48, this fastening orifice 50 cooperating with a hook 52 protruding from the support plate 10 on the internal side 12 of the frame 2, as shown in FIG. 4.

In order to ensure robust fastening of the bellows 28 on the frame 2, the bellows 28 comprises for example a plurality of fastening tabs 42, for example three fastening tabs 42 as shown in FIG. 3, distributed around the internal end 32 of the bellows 28 and each passing into a corresponding through orifice 44 of the frame 2. Each fastening tab 42 is attached to the frame 2 on the internal side 12, for example by cooperating with a corresponding hook 52. The through orifices 44 are distributed around the passage opening 30 so that the bellows 28 is attached to the frame 2 all around the passage opening 30.

Thus, on the side of the internal end 32 of the bellows 28, the latter is rigidly attached to the frame 2 around the passage opening 30 receiving the fan 26. More particularly, the internal end 32 of the bellows 28 is pressed against the support plate 10 thanks to the fastening tabs 42 which pass from the external side 14 to the internal side 12 and which are attached on the internal side 12. Thus, good fluid communication between the bellows 28 and the fan 26 is ensured and the gas flow losses are reduced by preventing the passage of this flow between the internal end 32 of the bellows 28 and the external side 14 of the support plate 10.

On the side of the external end 34 of the bellows 28, the bellows 28 is for example attached to the lining 22 of the padding 4 via a seal 54, extending around the duct 36 along the external end 34 of the bellows 28 and attached around a through opening 56 in the lining 22, as shown in FIGS. 1 and 2. The bellows 28 and the seal 54 are for example attached by bonding or stitching to the lining 22. This ensures robust and sealed fastening between the bellows 28 and the padding 4 and the gas flow losses are reduced by preventing the passage of this flow between the external end 34 of the bellows 28 and the internal surface 24 of the padding 4.

Since the lining 22 is impermeable, the gas flow transmitted between the fan 26 and the padding 4 by the bellows 28 through the lining 22 does not escape from the padding on the side of its internal surface 24, and it is oriented toward the external surface 20 of the padding 4 in order to ventilate the occupant of the seat by passing through the layer of foam 16.

Furthermore, the bellows 28 is attached to the frame 2 independently of the fan 26 so that the latter can be mounted and removed from the frame 2 simply, for example for maintenance operations.

According to one embodiment, the support element 1 further comprises at least one inflatable element 8, as indicated above. Such an inflatable element 8 is attached to the frame 2 and is interposed between the frame 2, the external side, and the padding 4, on the side of its internal surface 24. The inflatable element 8 is deformable between a deflated configuration (FIG. 1) and an inflated configuration (FIG. 2), which makes it possible to move the padding 4 relative to the frame 2, for example to offer massage to the occupant of the passenger by alternately changing the inflatable element 8 from the deflated configuration to the inflated configuration. Thus, the padding 4 is movable between a rest position wherein the internal surface 24 of the padding 4 extends against the frame 2, which corresponds to the deflated configuration of the inflatable element 8, and an active position wherein the internal surface 24 of the padding is separated from the frame 2, which corresponds to the inflated configuration of the inflatable element 8. Since the bellows 28 is deformable, it accompanies the movement of the padding 4 to maintain the fluid communication between the fan 26 and the padding 4 in all the positions of the padding 4 relative to the frame 2. Thus, in the rest position of the padding 4, the bellows 28 is in its collapsed position under the effect of the pressure exerted by the padding 4 and the occupant of the seat, and, in the active position, the bellows 28 is in its deployed position. Thus, the bearing surface of the support element 1 can be ventilated effectively in all positions of the padding 4 relative to the frame.

It is understood that the support element 1 can comprise a plurality of inflatable elements 8. As a variant, the movement of the padding 4 can be actuated differently, for example by virtue of mechanical massage elements of the motor-type or other type.

The invention claimed is:

1. A seat support element comprising a frame and a padding mounted on the frame, said padding extending between an internal surface, close to the frame on an external side of said frame, and an external surface, opposite the internal surface and defining a bearing surface for an occupant of the seat, the support element comprising a ventilation device for the bearing surface, said ventilation device comprising a fan, mounted on the frame and arranged to emit a gas flow to the padding, and a bellows extending between the fan and the internal surface of the padding in order to transmit said gas flow from the fan to the padding, wherein the bellows comprises at least one fastening tab integral with the bellows forming a single piece and passing into an orifice passing through the frame from the external side to an internal side of the frame, opposite the external side, said fastening tab being attached to the frame on the internal side of said frame.

2. The support element according to claim 1, wherein the bellows comprises an internal end in fluid communication with the fan and an external end attached to the padding and in fluid communication with said padding, the bellows defining a duct extending along an axis of the internal end to the external end, the fastening tab extending protruding from the internal end substantially in a direction radial to the axis outside the duct.

3. The support element according to claim 2, wherein the external end of the bellows is sealingly attached to a lining of the padding, said lining forming the internal surface of the padding, said lining comprising a through opening, the external end of the bellows being in sealed fluid communication with said through opening such that the gas flow of the fan is transmitted to the inside of the padding through the lining by the duct of the bellows.

4. The support element according to claim 1, wherein the fan is mounted on the frame in an attachment opening of the frame from the internal side of said frame, the gas flow being emitted by the fan from the external side of said frame.

5. The support element according to claim 4, wherein the orifice receiving the fastening tab of the bellows extends along a part of the edge of the attachment opening.

6. The support element according to claim 1, wherein the bellows comprises a plurality of fastening tabs, each fastening tab passing into a corresponding through-hole of the frame and being attached to the frame from the internal side of said frame.

7. The support element according to claim 6, wherein the through-holes are distributed around an attachment opening.

8. The support element according to claim 1, wherein the fastening tab extends between a proximal end integral with the rest of the bellows and a distal end attached to the frame, the proximal end extending from the external side of the frame and the distal end extending from the internal side of the frame.

9. The support element according to claim 8, wherein the distal end comprises a fastening orifice, said fastening orifice cooperating with a hook extending protruding from the internal side of the frame to secure the fastening tab to the frame.

10. The support element according to claim 1, wherein the padding is movable relative to the frame between a rest position, wherein the internal surface of the padding extends against the frame, and an active position, wherein the internal surface of the padding is separated from the frame, the bellows being elastically deformable between a collapsed position when the padding is in the rest position, and a deployed position when the padding is in the active position.

\* \* \* \* \*